United States Patent
Mihelich et al.

(10) Patent No.: US 9,870,055 B2
(45) Date of Patent: Jan. 16, 2018

(54) ELECTRONIC DEVICE INCLUDING SELECTIVELY OPERABLE AUDIO OUTPUT TRANSDUCERS OF TRANSDUCER PORT/RADIATOR PAIRS AND RELATED METHODS

(71) Applicant: Apple Inc., Cupertino, CA (US)

(72) Inventors: Ryan J. Mihelich, Cupertino, CA (US); Inna Lobel, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 42 days.

(21) Appl. No.: 14/847,787

(22) Filed: Sep. 8, 2015

(65) Prior Publication Data

US 2017/0068317 A1 Mar. 9, 2017

(51) Int. Cl.
| | | |
|---|---|---|
| *H04R 1/02* | (2006.01) | |
| *G06F 3/01* | (2006.01) | |
| *H04R 3/12* | (2006.01) | |
| *H04R 1/28* | (2006.01) | |
| *H04M 1/03* | (2006.01) | |
| *H04R 5/02* | (2006.01) | |

(52) U.S. Cl.
CPC .............. *G06F 3/016* (2013.01); *H04M 1/03* (2013.01); *H04R 1/2834* (2013.01); *H04R 1/2857* (2013.01); *H04R 3/12* (2013.01); *H04R 5/02* (2013.01); *H04R 2400/03* (2013.01); *H04R 2499/11* (2013.01); *H04R 2499/15* (2013.01)

(58) Field of Classification Search
CPC .. G06F 3/16; G06F 3/016; H04R 3/12; H04R 1/2834; H04R 1/2857; H04R 2499/15; H04R 2400/03; H04R 2201/029; H04R 2307/023; H04R 2499/11; H04R 5/02; H04M 1/03
USPC .................. 381/386–388, 349, 186, 340, 87, 381/333–336; 348/725, 735; 463/31; 709/201; 345/173, 177
See application file for complete search history.

(56) References Cited

U.S. PATENT DOCUMENTS

| | | | |
|---|---|---|---|
| 8,169,402 B2 | 5/2012 | Shahoian et al. | |
| 2007/0081691 A1* | 4/2007 | Park ........................ | H04M 1/03 381/386 |

(Continued)

FOREIGN PATENT DOCUMENTS

| | | |
|---|---|---|
| WO | 2013169299 A1 | 11/2013 |
| WO | 2013169303 A1 | 11/2013 |

(Continued)

OTHER PUBLICATIONS

Mihelich, Ryan J., U.S. Appl. No. 14/847,505, filed Sep. 8, 2015.

(Continued)

*Primary Examiner* — Vivian Chin
*Assistant Examiner* — Friedrich W Fahnert
(74) *Attorney, Agent, or Firm* — Allen, Dyer, Doppelt + Gilchrist, P.A.

(57) ABSTRACT

An electronic device may include a housing, a display carried by the housing, and audio output transducer and passive radiator pairs carried by the housing. The electronic device may also include a controller capable of selectively operating the audio output transducers. In another embodiment, the electronic device may include audio output transducer and serpentine tuning port pairs.

43 Claims, 9 Drawing Sheets

(56) References Cited

U.S. PATENT DOCUMENTS

| | | | |
|---|---|---|---|
| 2007/0092096 A1* | 4/2007 | Litovsky | H04R 1/2834 381/349 |
| 2007/0201712 A1* | 8/2007 | Saiki | H04R 1/2834 381/186 |
| 2012/0140970 A1* | 6/2012 | Kim | H04R 1/30 381/340 |
| 2013/0148031 A1* | 6/2013 | Kohmoto | H04N 5/64 348/725 |
| 2013/0321714 A1* | 12/2013 | Kobayashi | H04N 5/2628 348/738 |
| 2014/0193005 A1* | 7/2014 | Riggs | H04R 5/02 381/300 |
| 2014/0197936 A1 | 7/2014 | Biggs et al. | |
| 2014/0219490 A1* | 8/2014 | Quinn | H04R 1/2803 381/349 |
| 2014/0324938 A1* | 10/2014 | Gardenfors | H04L 67/10 709/201 |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2016/0038837 A1* | 2/2016 | Fujioka | G06F 1/1628 463/31 |
| 2016/0187988 A1* | 6/2016 | Levesque | F16M 11/18 345/156 |
| 2016/0316050 A1* | 10/2016 | Lombardi | H04M 1/7253 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

OTHER PUBLICATIONS

Mihelich, Ryan J., U.S. Appl. No. 14/847,584, filed Sep. 8, 2015.
Mihelich, Ryan J., U.S. Appl. No. 14/847,698, filed Sep. 8, 2015.
Product Specification Sheet: GEEPLUS, VIBRO1 Vibration Actuator, 2 pages, www.geeplus.biz, downloaded on Jul. 15, 2015.

* cited by examiner

ELECTRONIC DEVICE INCLUDING SELECTIVELY OPERABLE AUDIO OUTPUT TRANSDUCERS OF TRANSDUCER PORT/RADIATOR PAIRS AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a housing, a display carried by the housing, and a plurality of audio output transducer and passive radiator pairs carried by the housing. The electronic device may also include a controller capable of selectively operating the plurality of audio output transducers. Accordingly, haptic feedback may be provided via the display, for example, which may be directed based upon the selected operation of the audio output transducers.

The electronic device may further include a respective baffle enclosure carrying each of the plurality of audio output transducer and passive radiator pairs. Each baffle enclosure may have a radiator opening therein for each of the passive radiators, and each passive radiator may include a radiator mass and radiator suspension coupling the radiator mass within the radiator opening, for example.

The housing may have has a plurality of audio output ports therein associated with the plurality of audio output transducer and passive radiator pairs. Each audio output transducer may be acoustically coupled to a respective one of the plurality of audio output ports and each passive radiator may be acoustically coupled between the audio output transducer and the display, and acoustically isolated from the respective audio output port.

Each audio output transducer may be directed to an underside of the display. Each passive radiator may be directed to an underside of the display, for example.

The display may be a touch-screen display. The controller may be capable of selectively operating the plurality of audio output transducers based upon input from the touch-screen display, for example.

Another device aspect is directed to an electronic device that includes a housing having an audio output port therein, a display carried by the housing, and a plurality of audio output transducer and serpentine tuning port pairs carried by the housing. The electronic device may also include a controller capable of selectively operating the plurality of audio output transducers.

A method aspect is directed to a method of making an electronic device that includes a housing and a display carried by the housing. The method includes mounting a plurality of audio output transducer and passive radiator pairs on the housing and coupling a controller to selectively operate the plurality of audio output transducers.

Another method aspect is directed to a method of making an electronic device that includes a housing and a display carried by the housing. The method may include mounting a plurality of audio output transducer and serpentine tuning port pairs on the housing, and coupling a controller to selectively operate the plurality of audio output transducers.

BRIEF DESCRIPTION OF THE DRAWINGS

FIG. 5b is a schematic top view of the serpentine tuning port of FIG. 5a.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime and multiple prime notation is used to refer to like elements in different embodiments.

Figure 1:
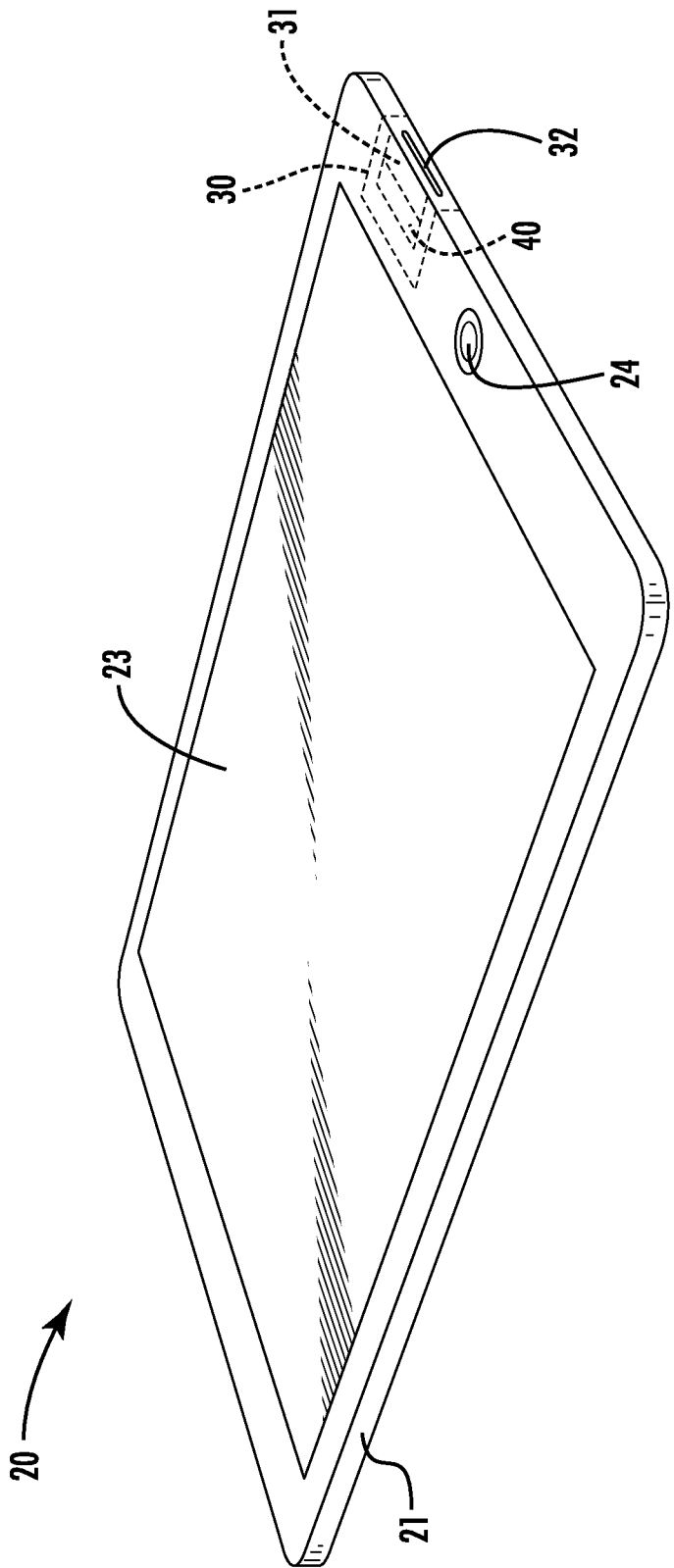
FIG. 1 a perspective view of an electronic device according to an embodiment.
Figure 2:
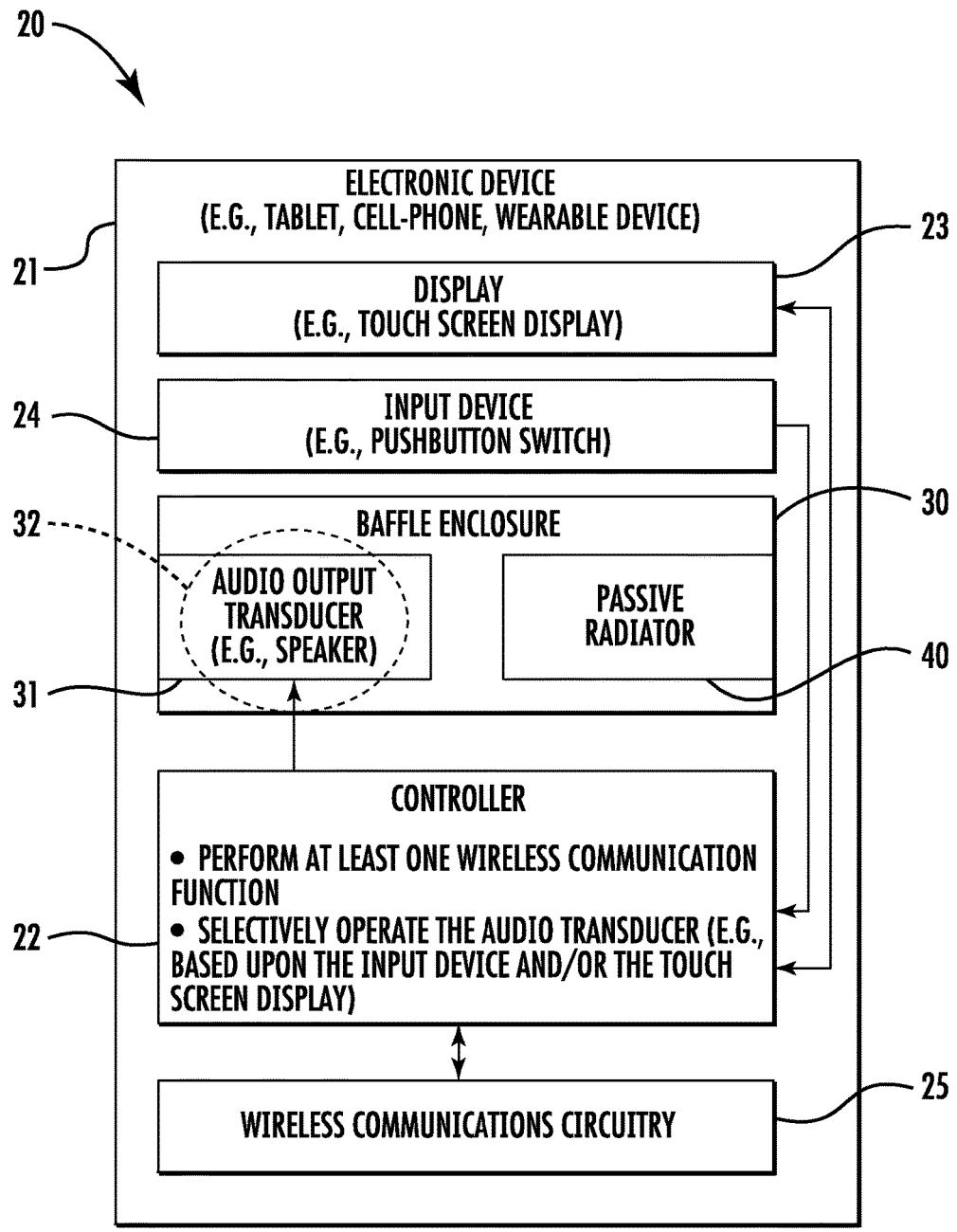
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, tablet computer. The electronic device 20 may be another type of electronic device, for example, a cellular telephone, a wearable device, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a touch screen display, for example, or may be another type of display, as will be appreciated by those skilled in the art. The display 23 may include a glass layer, for example, a relatively thin protective glass, may be over the display layers, as will be appreciated by those skilled in the art.

A finger-operated user input device, illustratively in the form of a pushbutton switch 24 is also carried by the device housing 21 and is coupled to the controller 22. The pushbutton switch 24 may cooperate with the controller 22 to perform a device function in response to operation thereof. For example, a device function may include a powering on or off of the electronic device 20, initiating communication via the wireless communications circuitry 25, and/or performing a menu function. Of course, there may be additional user input devices, for example, the display 23 when it is in the form of a touch screen display, that perform other and/or additional device functions.

Figure 3:
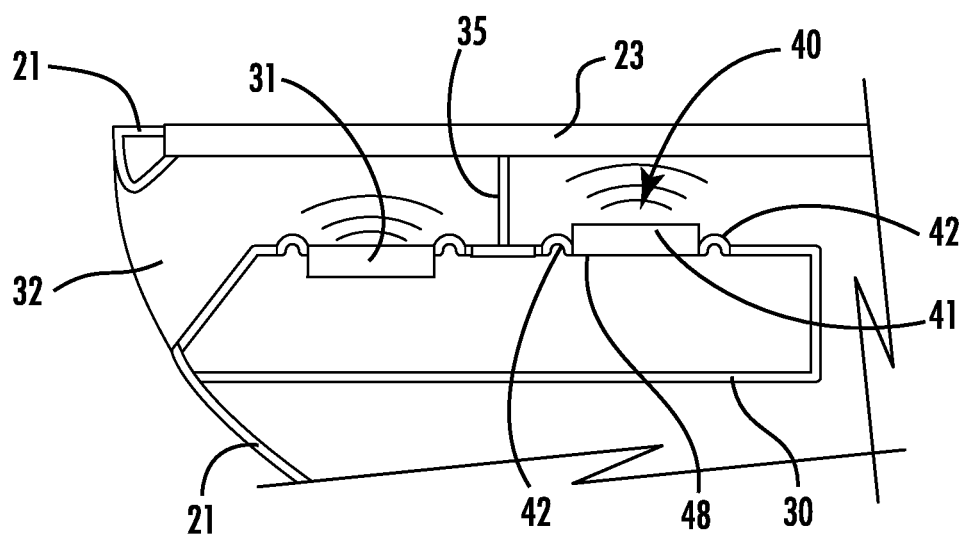
FIG. 3 is schematic cross-sectional view of a portion of the electronic device of FIG. 2.

Referring now additionally to FIG. 3, the electronic device 20 illustratively includes a baffle enclosure 30 carried by the housing. The baffle enclosure 30 carries an audio output transducer, in the form of a miniature speaker 31. The speaker 31 is coupled to the controller 22 and cooperates therewith to output audio, for example, music, device status sounds, notifications, etc. Of course, the speaker 31 may output other types of audio.

The baffle enclosure 30, and more particularly, the speaker 31 is positioned or aligned so that it is acoustically coupled to an audio output port 32 in the bottom of the housing. The audio output port 32 may be positioned elsewhere in the device housing 21. The speaker 31 is also directed to an underside of the display 23 for providing haptic feedback through the display, as will be explained in further detail below.

A passive radiator 40 is also carried by the baffle enclosure 30 laterally adjacent the speaker 31. In other embodiments, the passive radiator 40 and speaker 31 may not be laterally adjacent. The passive radiator 40 is acoustically coupled to the display 23, and more particularly, between the speaker 31 and the display, and directed to the underside of the display to also provide the haptic feedback through the display. The passive radiator 40 is also acoustically isolated from the audio output port 32, as will be explained in further detail below. In some embodiments, the passive radiator 40 may include non-metallic materials, for example, ceramic or porcelain. The passive radiator 40 may be formed of other and/or additional materials.

The baffle enclosure 30 has a radiator opening 48 therein. The passive radiator 40 includes a radiator mass 41 and a radiator suspension 42 coupling the radiator mass within the radiator opening 48. The radiator mass 41 may be tungsten, and the radiator suspension 42 may include rubber and/or another relatively soft resilient material. The radiator mass 41 and the radiator suspension 42 may include other and/or additional materials. The mass 41 may in the form of a disc-shaped body.

The acoustic isolation between the speaker 31 and the passive radiator 40 is provided by a partition 35 within the housing 21 and outside the baffle enclosure 30 between the speaker and the passive radiator.

To generate haptic feedback, the passive radiator 40 may be tuned through inertia and internal acoustic pressure. The tuning may be selected such that the fundamental frequency of the desired haptic response is about equal to the tuning frequency of the passive radiator 40 for increased efficiency and reduced impact on audio performance. At the tuning frequency of the passive radiator 40, the speaker 31 generally has a low excursion resulting in relatively low distortion in the audio signals.

The passive radiator 40 vents acoustically into the housing 21, using the acoustic pressure to induce a distributed mechanical force on components inside the housing, for example, the display. The mechanical force results in a vibration event on the exterior of the product. For example, the vibration event may be a flexing of the glass, which in some embodiments is secured via an adhesive at the ends and sprung in the middle, anywhere between 5 and 10 microns.

During operation, the controller 22 may operate the speaker 31 at a relatively low frequency, for example, below 100 Hz. Operation below 100 Hz, for example, may be inefficient for the speaker 31 with respect to audibly hearing any sound, but operation at such a low frequency can be felt by a user, particularly when paired with the passive radiator 40 and configured as described above. Accordingly, by selectively operating the speaker 31, haptic feedback is provided through the display 23. In some embodiments, the haptic feedback may be in response to input via the display 23, when the display is in the form of a touch screen display. In other words, it may be desirable to set the operation frequency to a frequency equal to the resonance frequency of the passive radiator 40. A frequency of 100 Hz may be considered a reasonable frequency for the present embodiment.

A method aspect is directed to a method of making an electronic device 20 that includes a housing 21 having an audio output port 32 therein and a display 23 carried by the housing. The method includes mounting an audio output transducer 31 on a baffle enclosure 30 and mounting a passive radiator 40 on the baffle enclosure. The method also includes mounting the baffle enclosure 30 within the housing 21 so that the audio output transducer 31 is acoustically coupled to the audio output port 32 and so that the passive radiator 40 is acoustically coupled between the audio output transducer and the display 23, and acoustically isolated from the audio output port.

Figure 4:
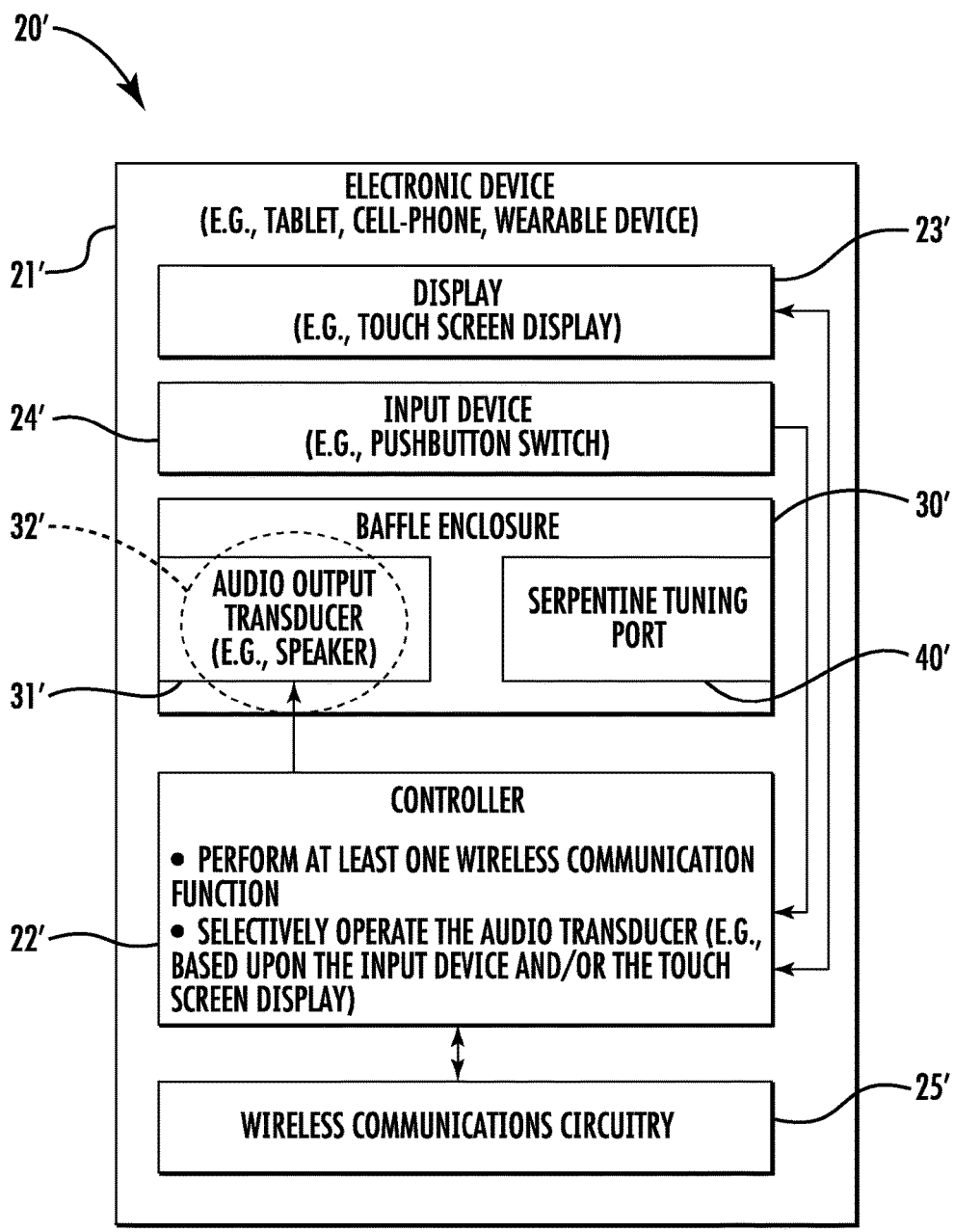
FIG. 4 is a schematic block diagram of the electronic device according to another embodiment.
Figure 5A:
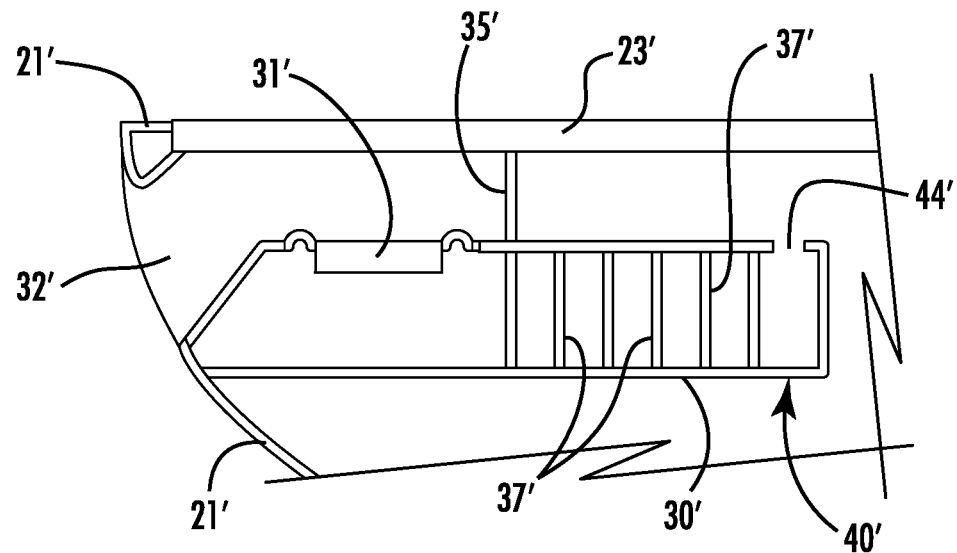
FIG. 5a is a schematic cross-sectional view of a portion of the electronic device of FIG. 4.
Figure 5B:
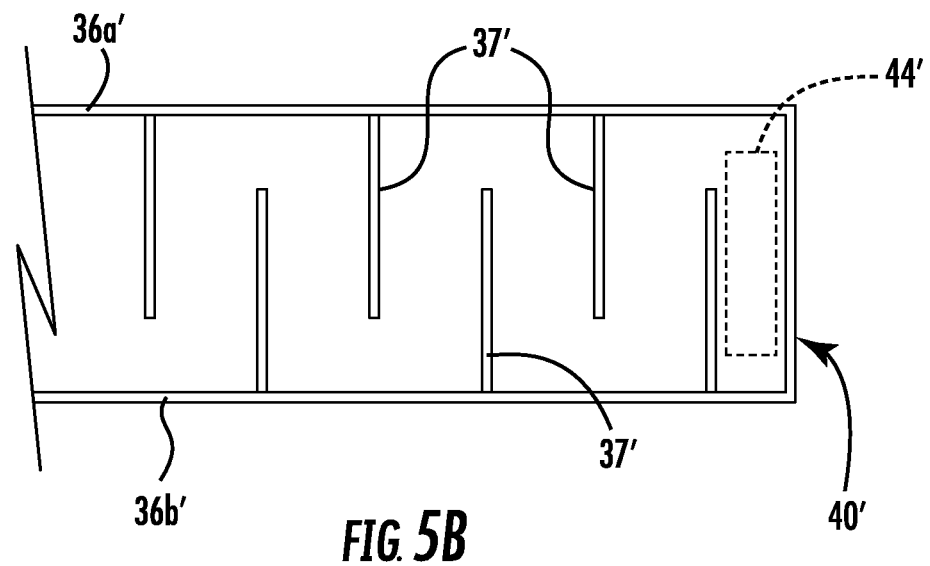

Referring now to FIGS. 4 and 5, in another embodiment, instead of a passive radiator, a plurality of internal partitions 37' are carried by the baffle enclosure 30' to define a serpentine tuning port 40' laterally adjacent the speaker 31'. In other embodiments, the serpentine port 40' and speaker 31' may not be laterally adjacent. The serpentine tuning port 40' is acoustically coupled to the display 23', and more particularly, between the speaker 31' and the display. The baffle enclosure 30' also has a tuning port opening 44' therein, and the serpentine tuning port 40' is directed to the underside of the display 23' to also provide the haptic feedback through the display. The serpentine tuning port 40' is also acoustically isolated from the audio output port 32'.

The baffle enclosure 30' has first and second opposing sidewalls 36a', 36b'. The internal partitions 37' illustratively are parallel and extend inwardly from the opposing first and second sidewalls 36a', 36b', in an alternating fashion. In other embodiments, the internal partitions 37' may be configured differently, for example, to be tuned to a desired frequency for haptic feedback.

The serpentine tuning port 40' is tuned, for example, by shape, length, width, etc., as will be appreciated by those skilled in the art, for the desired operational frequency for haptic feedback.

Similar to the passive radiator described above, the acoustic isolation between the speaker 31' and the serpentine tuning port 40' is provided by a partition 35' within the housing 21' between the speaker and the serpentine tuning port. More particularly, the partition 35' extends transverse to the sidewall of the device housing 21' and a sidewall of the baffle enclosure 30'.

To generate haptic feedback, the serpentine tuning port 40' may be tuned as noted above, but unlike the passive radiator, there is not an inertial component. Similar to the passive radiator, the serpentine tuning port 40' vents acoustically into the housing 21', using the acoustic pressure to induce a distributed mechanical force on components inside the housing, for example, the display 23'. The mechanical force results in a vibration event on the exterior of the electronic device 20'. For example, the vibration event may be a flexing of the glass, which in some embodiments is secured via an adhesive at the ends and sprung in the middle, anywhere between 5 and 10 microns.

During operation, the controller 22' may operate the speaker 31' at a relatively low frequency, for example, below 100 Hz. Operation below 100 Hz, for example, may be inefficient for the speaker 31' with respect to audibly hearing any sound, but operation at such a low frequency can be felt by a user, particularly when paired with the serpentine tuning port 40' and configured as described above. Accordingly, by selectively operating the speaker 31', haptic feedback is provided through the display 23'. In some embodiments, the haptic feedback may be in response to input via the display 23', when the display is in the form of a touch screen display. In other words, it may be desirable to set the operation frequency to frequency equal to the resonance frequency of the serpentine tuning port 40' A frequency of 100 Hz may be considered a reasonable frequency for the present embodiment.

Additionally, the serpentine tuning port 40' may be cheaper, in terms of cost to manufacture and implement, than the passive resonator. For example, for larger displays, the mass on the passive radiator would have to be relatively large to induce the distributed mechanical force, which may become relatively costly. As will be appreciated by those skilled in the art, if there is a large enough cross-sectional area, a serpentine tuning port may be more advantageous than a passive radiator.

A method aspect is directed to a method of making an electronic device 20' that includes a housing 21' having an audio output port 32' therein and a display 23' carried by the housing. The method includes mounting an audio output transducer 31' on a baffle enclosure 30' and mounting a plurality of internal partitions 37' on the baffle enclosure to define a serpentine tuning port 40' therein. The method includes mounting the baffle enclosure 30' so that audio output transducer is acoustically coupled to the audio output port 32', and so that the serpentine tuning port 40' is acoustically coupled between the audio output transducer and the display and to be acoustically isolated from the audio output port.

Figure 6:
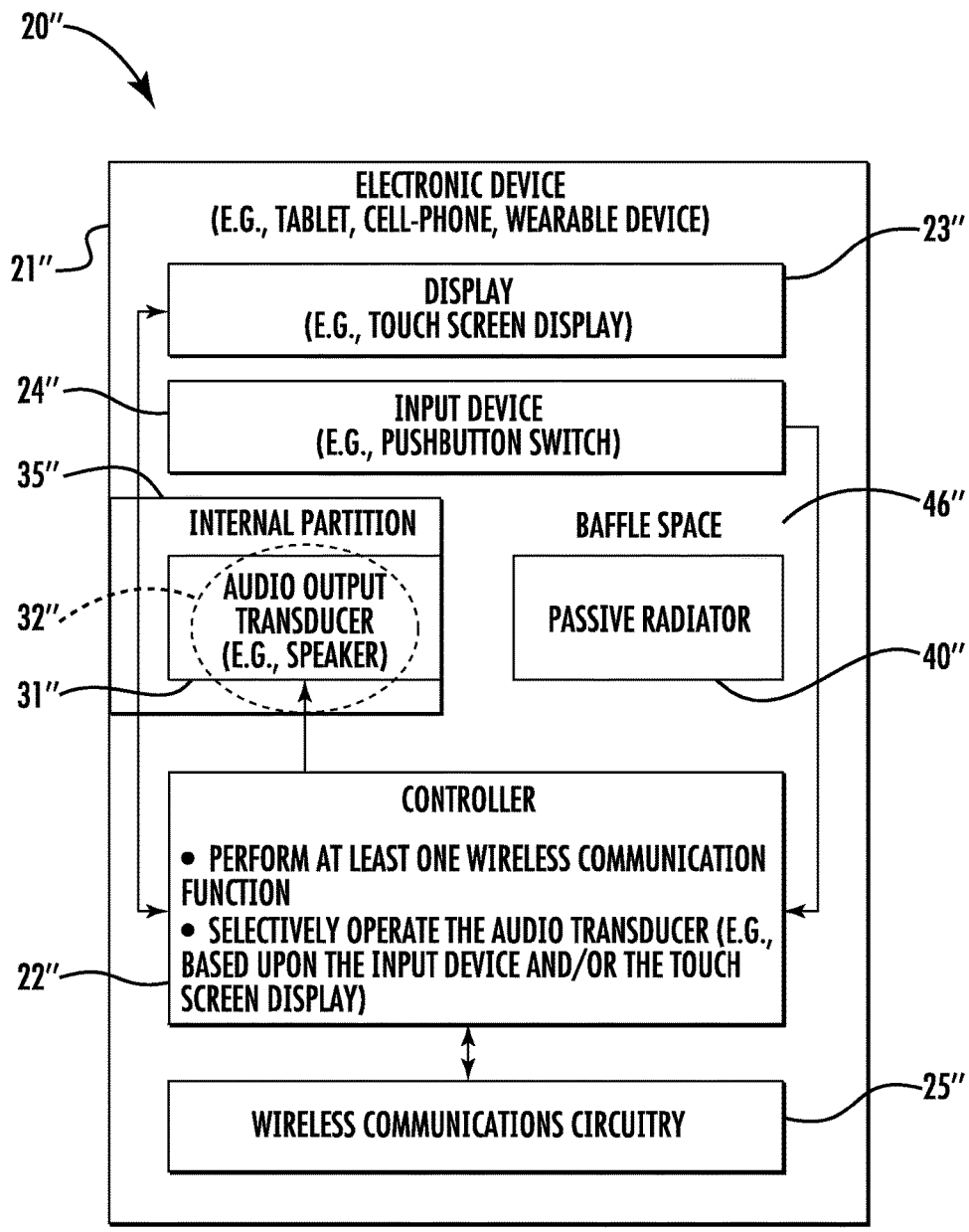
FIG. 6 is a schematic block diagram of the electronic device according to another embodiment.
Figure 7:
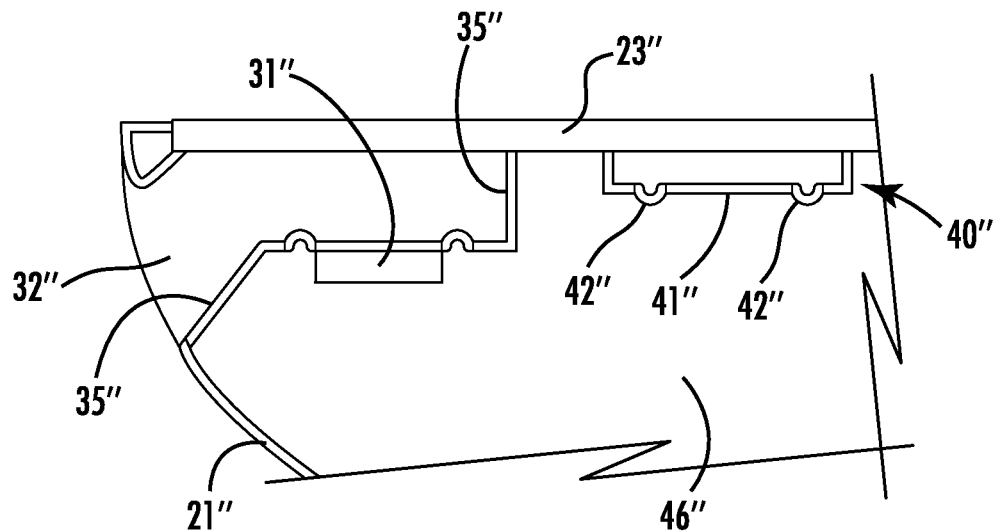
FIG. 7 is a schematic cross-sectional view of a portion of the electronic device of FIG. 6.

Referring now to FIGS. 6 and 7, in another embodiment, an internal partition 35" is illustratively carried within the housing 21". The internal partition 35" may divide the internal area of the device housing 21" between relatively small and large spaces, the larger space defining a baffle space 46". The baffle space 46" is behind the display 23". It should be noted that the baffle space 46" may be behind a portion of the display 23" or may be behind all of the display. In other words, the baffle space 46" may be a relatively large portion of the interior of the device housing 21" that carries circuitry, etc. and may be more than half of the interior area of the device housing.

An audio output transducer in the form of a miniature speaker 31" is carried by the internal partition 35" and is acoustically coupled to the audio output port 32". A passive radiator 40" is within the baffle space 46" and is acoustically coupled between the speaker 31" and the display 23". The passive radiator 40" is also acoustically isolated from the audio output port 32".

The passive radiator 40" is similar to that described above with respect to FIGS. 2 and 3, and includes a radiator baffle enclosure 30", which is carried within the baffle space 36", a radiator mass 41" and a radiator suspension 42". In other words, the passive radiator 40" is physically separated within the device housing 21" from the speaker 31".

The acoustic isolation between the speaker 31" and the passive radiator 40" is provided by the internal partition 35" within the housing 21" and outside the baffle enclosure 30" between the speaker and the passive radiator. More particularly, the passive radiator 40" is positioned within the device housing 21" so that the one side of the mass 41" is exposed to the acoustic flow, while another side of the mass is not. Using this arrangement, the passive radiator 40" may be located anywhere in the baffle space 46". More than one passive radiator 40" may be within the baffle space so long as the passive radiator is acoustically coupled between the speaker 31" and the display 23", and is acoustically isolated from the audio output port 32".

To generate haptic feedback, the passive radiator 40" may be tuned through inertia and internal acoustic pressure. It should be noted that the inertial component (i.e., reaction force) of the passive radiator 40" is in the opposite direction than the passive radiator described above with respect to the FIGS. 2 and 3. Thus, it may not be particularly desirable to position the passive radiator 40" adjacent a side of the housing 21" opposite the display, as haptic efficiency may be greatly reduced. Similar to the passive radiator described above, the passive radiator 40" vents acoustically into the housing 21", using the acoustic pressure to induce a distributed mechanical force on components inside the housing, for example, the display 23". The mechanical force results in a vibration event on the exterior of the product.

As will be appreciated by those skilled in the art, the volume of air V between the passive radiator 40" and the display 23" may be particularly important as it performs as an air spring, which in turn affects the resonance frequency of the passive radiator. Operation of the speaker 31" using the controller 22" is similar to the embodiments described above.

Figure 8:
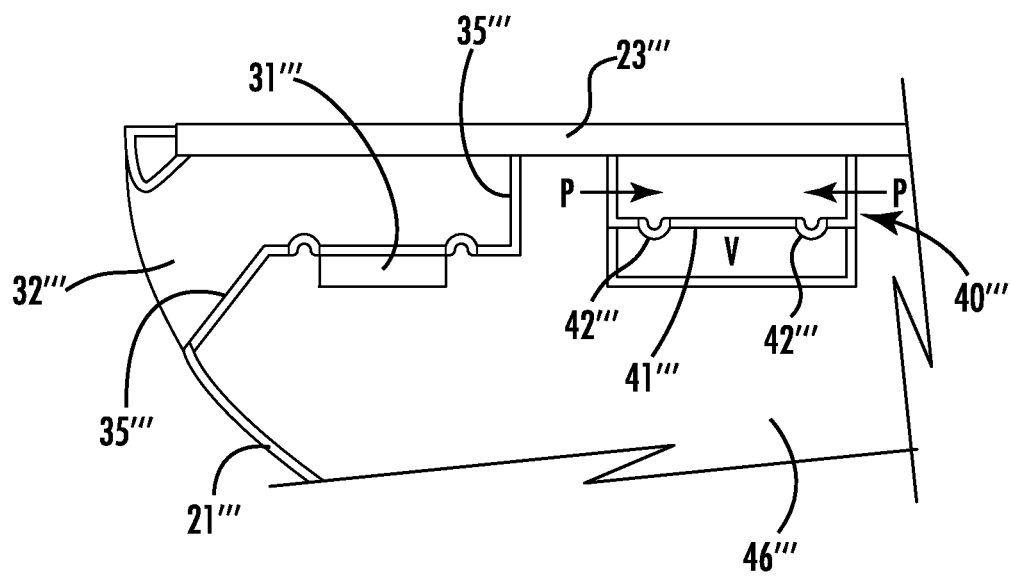
FIG. 8 is a schematic cross-sectional view of a portion of an electronic device according to another embodiment.

Referring now briefly to FIG. 8, in another embodiment similar to the embodiment described above with respect to FIGS. 6 and 7, the passive radiator 40'" is mounted to the underside of the display 23'" such that airflow is permitted between the radiator mass 41'" and the radiator suspension 42'". In this arrangement, the actuation pressure P occurs on the side of the passive radiator 40'" facing the underside of the display 23'", with the passive radiator back volume V being in the space below.

A method aspect is directed to a method of making an electronic device 20" that includes a housing 21" having an audio output port 32" therein, and a display 23" carried by the housing. The method includes mounting an internal partition 35" within the housing 21" to define a baffle space 46" behind at least a portion of the display 23", mounting an audio output transducer 31" on the internal partition so that it is acoustically coupled to the audio output port 32", and mounting a passive radiator 40" within the baffle space so that it is acoustically coupled between the audio output transducer and the display and acoustically isolated from the audio output port.

Figure 9:
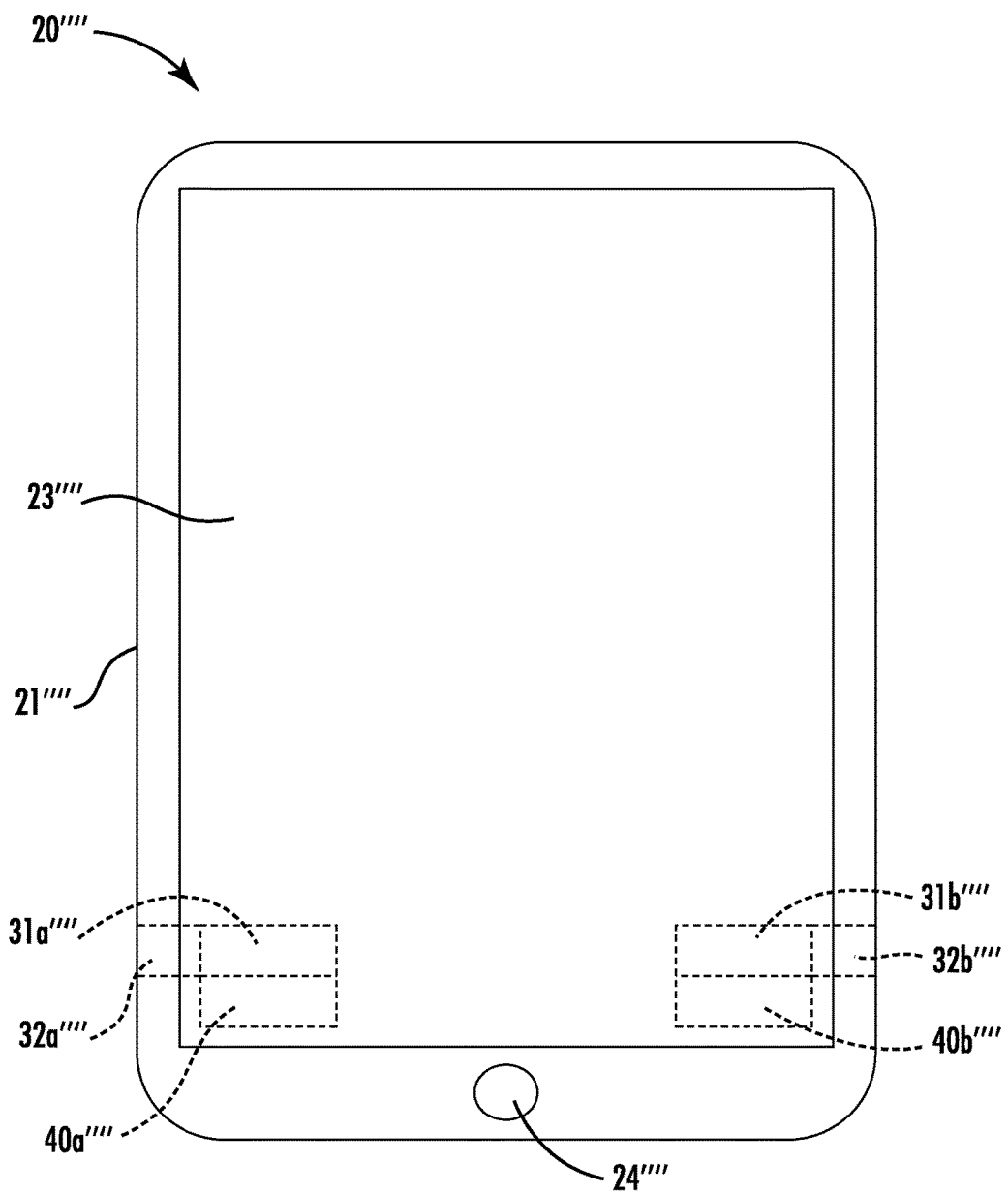
FIG. 9 is a top view schematically illustrating a portion of an electronic device according to another embodiment.

Referring to FIG. 9, in another embodiment of the electronic device 20'''' there may be a plurality of audio output transducer and passive radiator pairs, and more specifically, for stereo operation, two pairs of audio output transducer and passive radiator pairs 31a'''', 31b'''', 40a'''', 40b'''' carried by the housing 21''''. Each of the two pairs of audio output transducers and passive radiators 31a'''', 31b'''', 40a'''', 40b'''' has a respective baffle enclosure and is similar to the audio output transducer and passive radiator described above with respect to FIGS. 2 and 3. In particular, each audio output transducer 31a'''', 31b'''' is acoustically coupled to a respective audio output port 32a'''', 32b'''', and each and passive radiator 40a'''', 40b'''' is coupled between the paired audio output transducer and the display 23'''' and acoustically isolated from the respective audio output port. The controller 22'''' may selectively operate the plurality of audio output transducers 31a'''', 31b'''' to provide stereo sound, and may also provide localized or directed haptic feedback through the areas of the display adjacent the passive radiators 40a'''', 40b''''.

A method aspect is directed to a method of making an electronic device 20'''' that includes a housing 21'''' and a display 23'''' carried by the housing. The method includes mounting a plurality of audio output transducer and passive radiator pairs 31a'''', 31b'''', 40a'''', 40b'''' carried by the housing 21'''', and coupling a controller 22'''' to selectively operate the plurality of audio output transducers.

Figure 10:
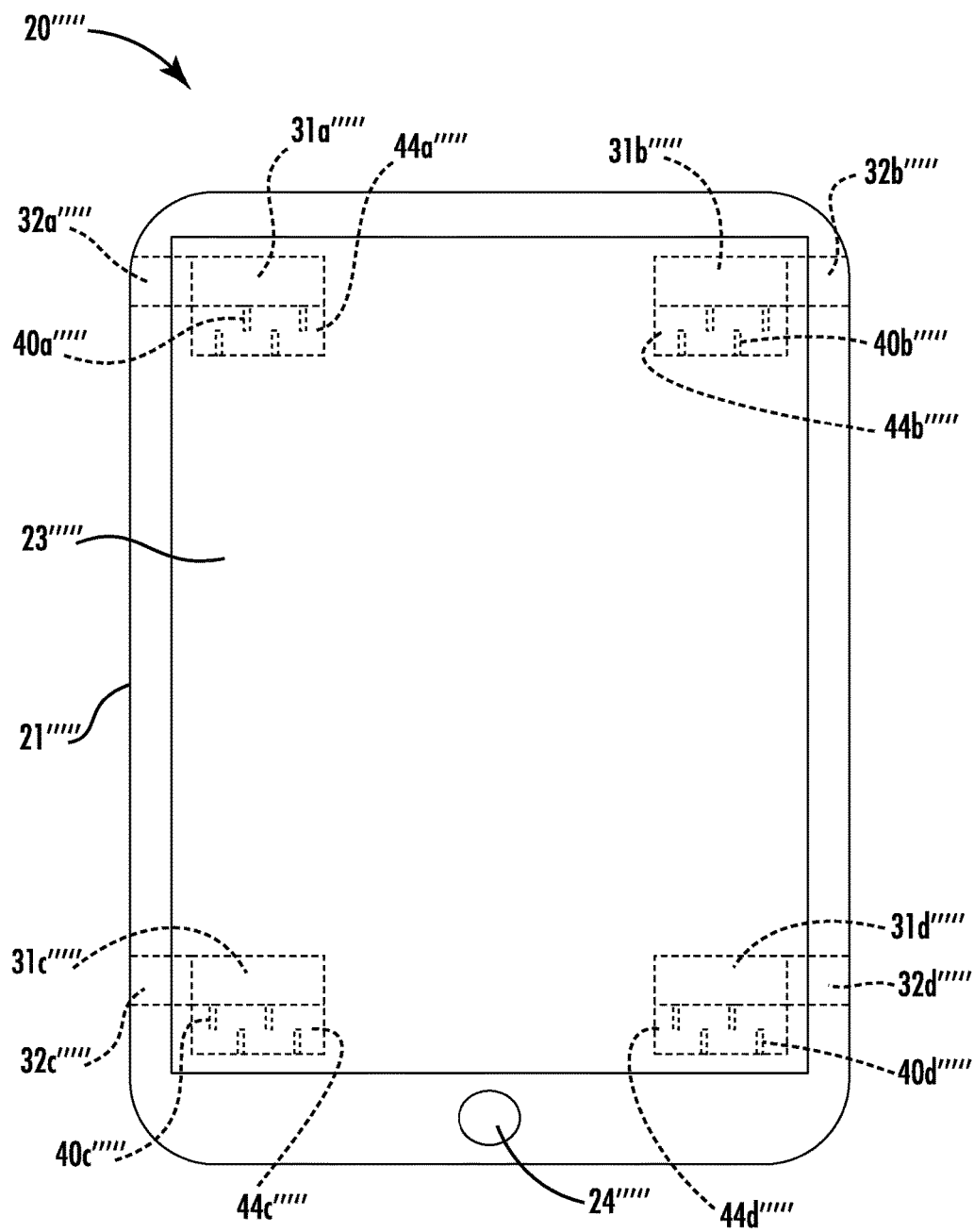
FIG. 10 is a top view schematically illustrating a portion of an electronic device according to another embodiment.

Referring to FIG. 10, in another embodiment of the electronic device 20'''' there may be a plurality of audio output transducer and serpentine tuning port pairs, and more specifically, for quadraphonic operation, four pairs of audio output transducer and serpentine tuning port pairs 31a''''-31d'''', 40a''''-40d'''' carried by the housing 21''''. Each of the four pairs of audio output transducers and passive radiators 31a''''-31d'''', 40a''''-40d'''' has a respective baffle enclosure and is similar to the audio output transducer and serpentine tuning port described above with respect to FIGS. 4, 5a, and 5b. In particular, each audio output transducer 31a''''-31d'''' is acoustically coupled to a respective audio output port 32a''''-32d'''', and each serpentine tuning port 40a''''-40d'''' is coupled between the paired audio output transducer and the display 23'''' and acoustically isolated from the respective audio output port. The controller 22'''' may selectively operate the plurality of audio output transducers 31a''''-31d'''' to provide quadraphonic sound, and may also provide localized or directed haptic feedback through the areas of the display 23'''' adjacent the passive radiators 40a'''', 40d'''', for example, the four corners of the display.

A method aspect is directed to a method of making electronic device 20'''' that includes a housing 21'''' and a display 23'''' carried by the housing. The method includes mounting a plurality of audio output transducer and serpentine tuning port pairs 31a''''-31d'''', 40a''''-40d'''' on the housing 21'''', and coupling a controller 22'''' to selectively operate the plurality of audio output transducers.

While two and four pairs of audio output transducer and passive radiator/serpentine tuning port pairs have been described, it will be appreciated by those skilled in the art that the there may be any number of audio output transducer and passive radiator or serpentine tuning port pairs. Moreover, in some embodiments, at least one pair may be an audio output transducer and passive radiator pair while at least one other pair may be an audio output transducer and serpentine tuning port pair. In other words, the plurality of pair may be mixed between audio output transducer and passive radiators pairs and audio output and serpentine tuning port pairs.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a housing;
a display carried by the housing;
a plurality of audio output transducer and passive radiator pairs carried between the display and the housing, each audio output transducer being directed to an underside of the display;
a respective baffle enclosure carrying each of the plurality of audio output transducer and passive radiator pairs; and
a controller configured to selectively operate the plurality of audio output transducers at or below a frequency of 100 Hz to provide localized haptic feedback through the display adjacent respective ones of the passive radiators.

2. The electronic device of claim 1 wherein each baffle enclosure has a radiator opening therein for each passive radiator; and wherein each passive radiator comprises a radiator mass, and radiator suspension coupling the radiator mass within the radiator opening.

3. The electronic device of claim 1 wherein the housing has a plurality of audio output ports therein associated with the plurality of audio output transducer and passive radiator pairs.

4. The electronic device of claim 3 wherein each audio output transducer is acoustically coupled to a respective one of the plurality of audio output ports; and wherein each passive radiator is acoustically coupled between the audio output transducer and the display, and acoustically isolated from the respective audio output port.

5. The electronic device of claim 1 wherein each passive radiator is directed to an underside of the display.

6. The electronic device of claim 1 wherein the display comprises a touch-screen display.

7. The electronic device of claim 6 wherein the controller is configured to selectively operate the plurality of audio output transducers based upon input from the touch-screen display.

8. An electronic device comprising:
a housing having an audio output port therein;
a display carried by the housing;
a plurality of audio output transducer and serpentine tuning port pairs carried between the display and the housing, each audio output transducer being directed to an underside of the display;
a respective baffle enclosure carrying each of the plurality of audio output transducer and serpentine tuning port pairs; and
a controller configured to selectively operate the plurality of audio output transducers at or below a frequency of 100 Hz to provide localized haptic feedback through the display adjacent respective ones of the serpentine tuning ports.

9. The electronic device of claim 8 wherein each serpentine tuning port is defined by a plurality of internal partitions carried by the baffle enclosure.

10. The electronic device of claim 8 wherein the housing has a plurality of audio output ports therein associated with the plurality of audio output transducer and serpentine tuning port pairs.

11. The electronic device of claim 10 wherein each audio output transducer is acoustically coupled to a respective one of the plurality of audio output ports; and wherein each serpentine tuning port is acoustically coupled between the audio output transducer and the display, and acoustically isolated from the respective audio output port.

12. The electronic device of claim 8 wherein each serpentine tuning port is directed to an underside of the display.

13. The electronic device of claim 8 wherein the display comprises a touch-screen display.

14. The electronic device of claim 13 wherein the controller is configured to selectively operate the plurality of audio output transducers based upon input from the touch-screen display.

15. A method of making an electronic device comprising a housing and a display carried by the housing, the method comprising:
   mounting a respective baffle enclosure carrying each of a plurality of audio output transducer and passive radiator pairs between the display and the housing so that each audio output transducer is directed to an underside of the display; and
   coupling a controller to selectively operate the plurality of audio output transducers at or below a frequency of 100 Hz to provide localized haptic feedback through the display adjacent respective ones of the passive radiators.

16. The method of claim 15 wherein the housing has a plurality of audio output ports therein associated with the plurality of audio output transducer and passive radiator pairs; and wherein mounting the plurality of audio output transducer and passive radiator pairs comprises mounting each audio output transducer to be acoustically coupled to a respective one of the plurality of audio output ports and mounting each passive radiator to be acoustically coupled between the audio output transducer and the display, and acoustically isolated from the respective audio output port.

17. The method of claim 15 wherein positioning the plurality of audio output transducer and passive radiator pairs comprises positioning the plurality of audio output transducer and passive radiator pairs so that each audio output transducer is directed to an underside of the display.

18. The method of claim 15 wherein positioning the plurality of audio output transducer and passive radiator pairs comprises positioning the plurality of audio output transducer and passive radiator pairs so that each passive radiator is directed to an underside of the display.

19. A method of making an electronic device comprising a housing and a display carried by the housing, the method comprising:
   mounting a respective baffle enclosure carrying each of a plurality of audio output transducer and serpentine tuning port pairs between the display and the housing so that each audio output transducer is directed to an underside of the display; and
   coupling a controller to selectively operate the plurality of audio output transducers at or below a frequency of 100 Hz to provide localized haptic feedback through the display adjacent respective ones of the serpentine tuning ports.

20. The method of claim 19 wherein each serpentine tuning port is defined by a plurality of internal partitions carried by the baffle enclosure.

21. The method of claim 19 wherein the housing has a plurality of audio output ports therein associated with the plurality of audio output transducer and serpentine tuning port pairs; and wherein mounting the plurality of audio output transducer and serpentine tuning pairs comprises mounting each audio output transducer to be acoustically coupled to a respective one of the plurality of audio output ports and mounting each serpentine tuning port to be acoustically coupled between the audio output transducer and the display, and acoustically isolated from the respective audio output port.

22. The method of claim 19 wherein positioning the plurality of audio output transducer and serpentine tuning port pairs comprises positioning the plurality of audio output transducer and serpentine tuning port pairs so that each serpentine tuning port is directed to an underside of the display.

23. An electronic device comprising:
   a housing;
   a touch-screen display carried by the housing;
   a plurality of audio output transducer and passive radiator pairs carried between the touch-screen display and the housing;
   a respective baffle enclosure carrying each of the plurality of audio output transducer and passive radiator pairs; and
   a controller configured to selectively operate the plurality of audio output transducers at or below a frequency of 100 Hz based upon input from the touch-screen display to provide localized haptic feedback adjacent respective ones of the passive radiators.

24. The electronic device of claim 23 wherein each baffle enclosure has a radiator opening therein for each passive radiator; and wherein each passive radiator comprises a radiator mass, and radiator suspension coupling the radiator mass within the radiator opening.

25. The electronic device of claim 23 wherein the housing has a plurality of audio output ports therein associated with the plurality of audio output transducer and passive radiator pairs.

26. The electronic device of claim 25 wherein each audio output transducer is acoustically coupled to a respective one of the plurality of audio output ports; and wherein each passive radiator is acoustically coupled between the audio output transducer and the touch-screen display, and acoustically isolated from the respective audio output port.

27. The electronic device of claim 23 wherein each audio output transducer is directed to an underside of the touch-screen display.

28. The electronic device of claim 23 wherein each passive radiator is directed to an underside of the touch-screen display.

29. An electronic device comprising:
   a housing having an audio output port therein;
   a touch-screen display carried by the housing;
   a plurality of audio output transducer and serpentine tuning port pairs carried between the touch-screen display and the housing;
   a respective baffle enclosure carrying each of the plurality of audio output transducer and serpentine tuning port pairs; and
   a controller configured to selectively operate the plurality of audio output transducers at or below a frequency of 100 Hz based upon input from the touch-screen display to provide localized haptic feedback adjacent respective ones of the serpentine tuning ports.

30. The electronic device of claim 29 wherein each serpentine tuning port is defined by a plurality of internal partitions carried by the baffle enclosure.

31. The electronic device of claim 29 wherein the housing has a plurality of audio output ports therein associated with the plurality of audio output transducer and serpentine tuning port pairs.

32. The electronic device of claim 31 wherein each audio output transducer is acoustically coupled to a respective one of the plurality of audio output ports; and wherein each serpentine tuning port is acoustically coupled between the audio output transducer and the display, and acoustically isolated from the respective audio output port.

33. The electronic device of claim 29 wherein each audio output transducer is directed to an underside of the touch-screen display.

34. The electronic device of claim 29 wherein each serpentine tuning port is directed to an underside of the touch-screen display.

35. A method of making an electronic device comprising a housing and a touch-screen display carried by the housing, the method comprising:
mounting a respective baffle enclosure carrying each of a plurality of audio output transducer and passive radiator pairs between the touch-screen display and the housing; and
coupling a controller to selectively operate the plurality of audio output transducers at or below a frequency of 100 Hz based upon input from the touch-screen display to provide localized haptic feedback adjacent respective ones of the passive radiators.

36. The method of claim 35 wherein the housing has a plurality of audio output ports therein associated with the plurality of audio output transducer and passive radiator pairs; and wherein mounting the plurality of audio output transducer and passive radiator pairs comprises mounting each audio output transducer to be acoustically coupled to a respective one of the plurality of audio output ports and mounting each passive radiator to be acoustically coupled between the audio output transducer and the touch-screen display, and acoustically isolated from the respective audio output port.

37. The method of claim 35 wherein positioning the plurality of audio output transducer and passive radiator pairs comprises positioning the plurality of audio output transducer and passive radiator pairs so that each audio output transducer is directed to an underside of the touch-screen display.

38. The method of claim 35 wherein positioning the plurality of audio output transducer and passive radiator pairs comprises positioning the plurality of audio output transducer and passive radiator pairs so that each passive radiator is directed to an underside of the touch-screen display.

39. A method of making an electronic device comprising a housing and a touch-screen display carried by the housing, the method comprising:
mounting a respective baffle enclosure carrying each of a plurality of audio output transducer and serpentine tuning port pairs between the touch-screen display and the housing; and
coupling a controller to selectively operate the plurality of audio output transducers at or below a frequency of 100 Hz based upon input from the touch-screen display to provide localized haptic feedback adjacent respective ones of the serpentine tuning ports.

40. The method of claim 39 wherein each serpentine tuning port is defined by a plurality of internal partitions carried by the baffle enclosure.

41. The method of claim 39 wherein the housing has a plurality of audio output ports therein associated with the plurality of audio output transducer and serpentine tuning port pairs; and wherein mounting the plurality of audio output transducer and serpentine tuning pairs comprises mounting each audio output transducer to be acoustically coupled to a respective one of the plurality of audio output ports and mounting each serpentine tuning port to be acoustically coupled between the audio output transducer and the touch-screen display, and acoustically isolated from the respective audio output port.

42. The method of claim 39 wherein positioning the plurality of audio output transducer and passive radiator pairs comprises positioning the plurality of audio output transducer and passive radiator pairs so that each audio output transducer is directed to an underside of the touch-screen display.

43. The method of claim 39 wherein positioning the plurality of audio output transducer and serpentine tuning port pairs comprises positioning the plurality of audio output transducer and serpentine tuning port pairs so that each serpentine tuning port is directed to an underside of the touch-screen display.

\* \* \* \* \*